Sept. 24, 1963　　　　F. R. WHITTEN　　　　3,104,712
FORMATION FLUID TESTING AND SAMPLING APPARATUS
Filed Aug. 12, 1959　　　　　　　　　　　　　　4 Sheets-Sheet 1

Frank R. Whitten
INVENTOR.

BY Donald H. Fidler
ATTORNEY

Sept. 24, 1963     F. R. WHITTEN     3,104,712

FORMATION FLUID TESTING AND SAMPLING APPARATUS

Filed Aug. 12, 1959     4 Sheets-Sheet 2

Frank R. Whitten
INVENTOR.

BY *Donald H. Fidler*

ATTORNEY

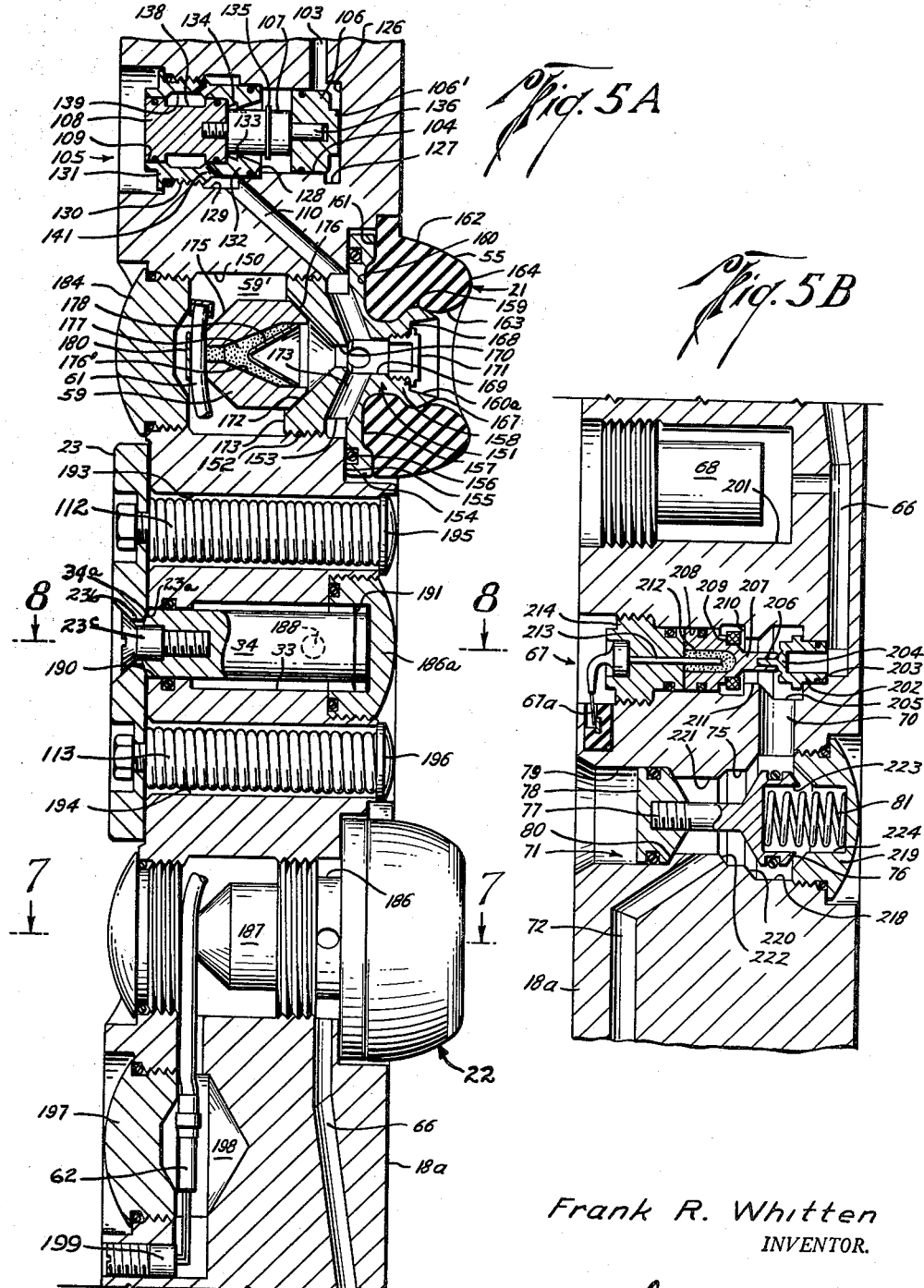

Sept. 24, 1963   F. R. WHITTEN   3,104,712
FORMATION FLUID TESTING AND SAMPLING APPARATUS
Filed Aug. 12, 1959   4 Sheets-Sheet 4
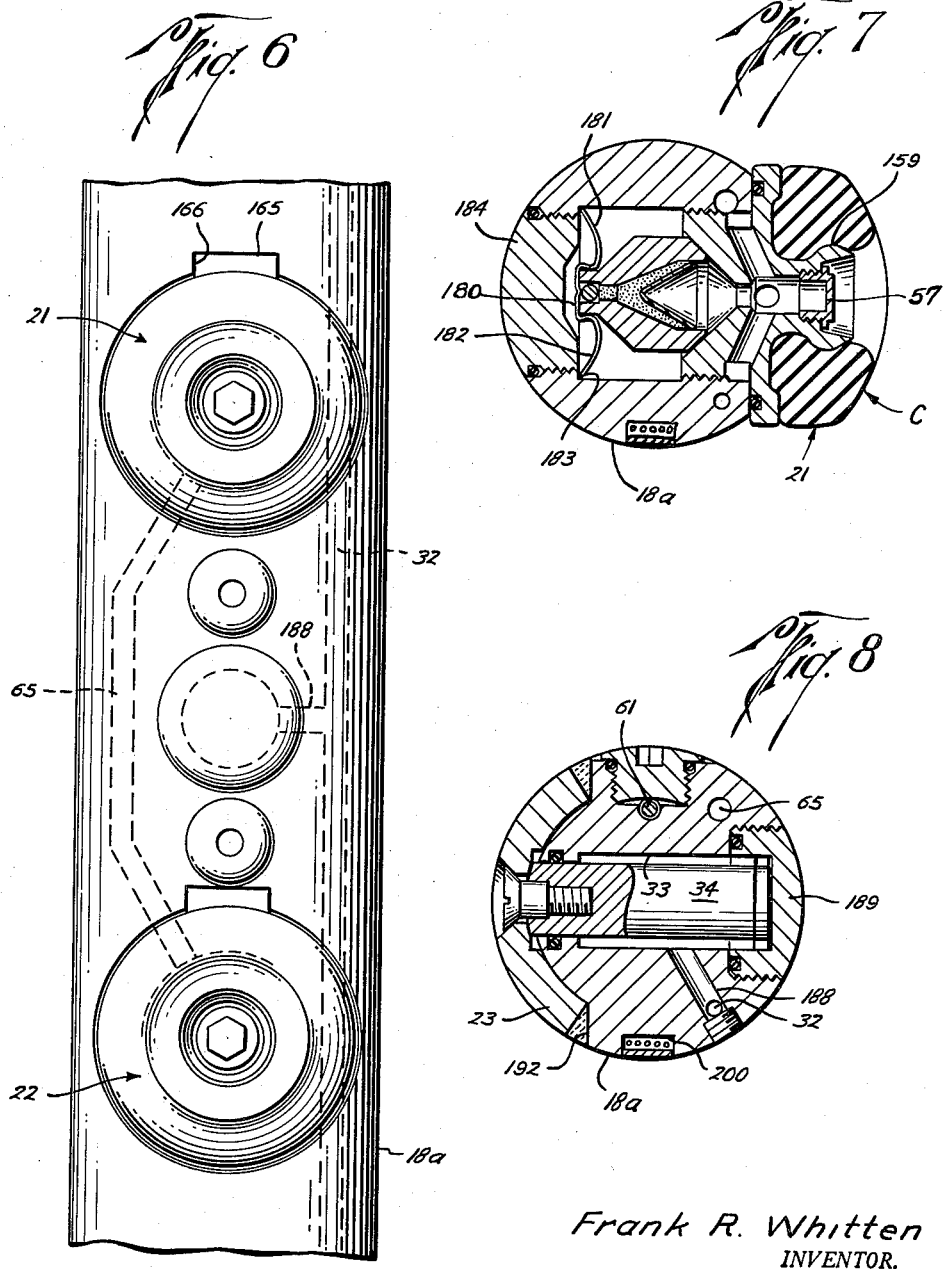
Frank R. Whitten
INVENTOR.
BY Donald H. Fidler
ATTORNEY

# United States Patent Office 3,104,712
Patented Sept. 24, 1963

3,104,712
FORMATION FLUID TESTING AND SAMPLING APPARATUS
Frank R. Whitten, Houston, Tex., assignor to Schlumberger Well Surveying Corporation, Houston, Tex., a corporation of Texas
Filed Aug. 12, 1959, Ser. No. 833,356
25 Claims. (Cl. 166—100)

This invention relates to new and improved fluid sample taking apparatus and, more particularly, to fluid sampling apparatus for sampling isolated portions of earth formations traversed by a bore.

Heretofore, formation samplers have employed a packoff shoe with a sealing member which is driven into engagement with the sidewall of a bore hole, the sealing member having a relatively large borehole wall engaging surface designed to isolate a portion of the formation from the usual drilling fluid in the borehole. Perforating means in the sampler opens the isolated portion of the formation to permit fluids from the formation to flow via the perforator port to a sample-receiving chamber. After a desired amount of fluid is obtained, the sample-receiving chamber is closed, the shoe and sealing member retracted and the apparatus withdrawn from the borehole so that the sample may be measured and analyzed. For a more complete description of the above type of apparatus, reference may be made to Lawrence S. Chambers Patent No. 2,674,313.

Although the above-described type of formation sampler has achieved wide commercial acceptance, an apparent need has arisen for a fluid sampler especially adapted for use in case wells and in relatively smooth boreholes in hard formations. Moreover, it is desirable to obtain additional information relative to the earth formations sampled than has heretofore been obtained and to increase the reliability of obtaining a sample.

Accordingly, it is an object of the present invention to provide new and improved fluid sampling apparatus for obtaining a fluid sample from earth formations over an interval along a well bore.

Another object of the present invention is to provide new and improved fluid sampling apparatus for obtaining a fluid sample from earth formations as well as additional information to evaluate the well.

Yet another object of the present invention is to provide a new and improved safety device for use with a fluid sampling apparatus to facilitate release of the apparatus from the sidewall of the bore.

Still another object of the present invention is to provide new and improved shaped charge gun block means which may be re-used any number of times.

In accordance with the present invention, fluid sampling apparatus is provided with a wall-engaging member mounted on a support member for movement between a retracted and extended position. In a retracted position of the wall-engaging member, the apparatus is adapted for passage through a well bore to a level where a fluid sample is desired, while in an extended position of the members, sample-admitting means on one of the members are urged into contact with the borehole wall. In one aspect of the present invention, at least two sample-admitting means are provided on one of the members and are spaced longitudinally from one another for testing over an interval along the bore, the sampling means being coupled for fluid communication with at least one sample-receiving chamber.

In another aspect of the present invention, a pressure sensing means is coupled to the fluid communication path between the sample-admitting means and a normally closed valve in the fluid communication path to obtain indications of the initial pressure of the formation fluids before a fluid sample is obtained. Additional valve means are provided to close the sample chamber so that the pressure sensing means may provide indications of the pressure of the formation fluids after a fluid sample has been obtained.

In still another aspect of the present invention, means are provided to equalize the pressures within and outside the sample-admitting means to facilitate retraction of the members from the bore wall.

Still other features of the present invention include a gun block arrangement for shaped charge means, which has an increased life expectancy, and a novel sealing pad for smooth bores.

The novel features of the present invention are set forth in the appended claims. The present invention, both as to its organization and manner of operation together with further objects and advantages thereof may best be understood by way of illustration and example when taken in conjunction with the accompanying drawings in which:

FIGS. 5A and 5B are cut-away views, partially in cross section, of upper and lower portions, respectively, comprising the testing section of the apparatus of FIG. 1;

FIG. 6 is a right side elevational view of a portion of the apparatus of FIG. 1 comprising the testing section of FIG. 5A taken along a plane perpendicular to the sheet of drawings;

FIG. 7 is a view in cross section taken along line 7—7 of FIG. 5A; and

FIG. 8 is a cross section taken along line 8—8 of FIG. 5A.

Figures 1, 2:
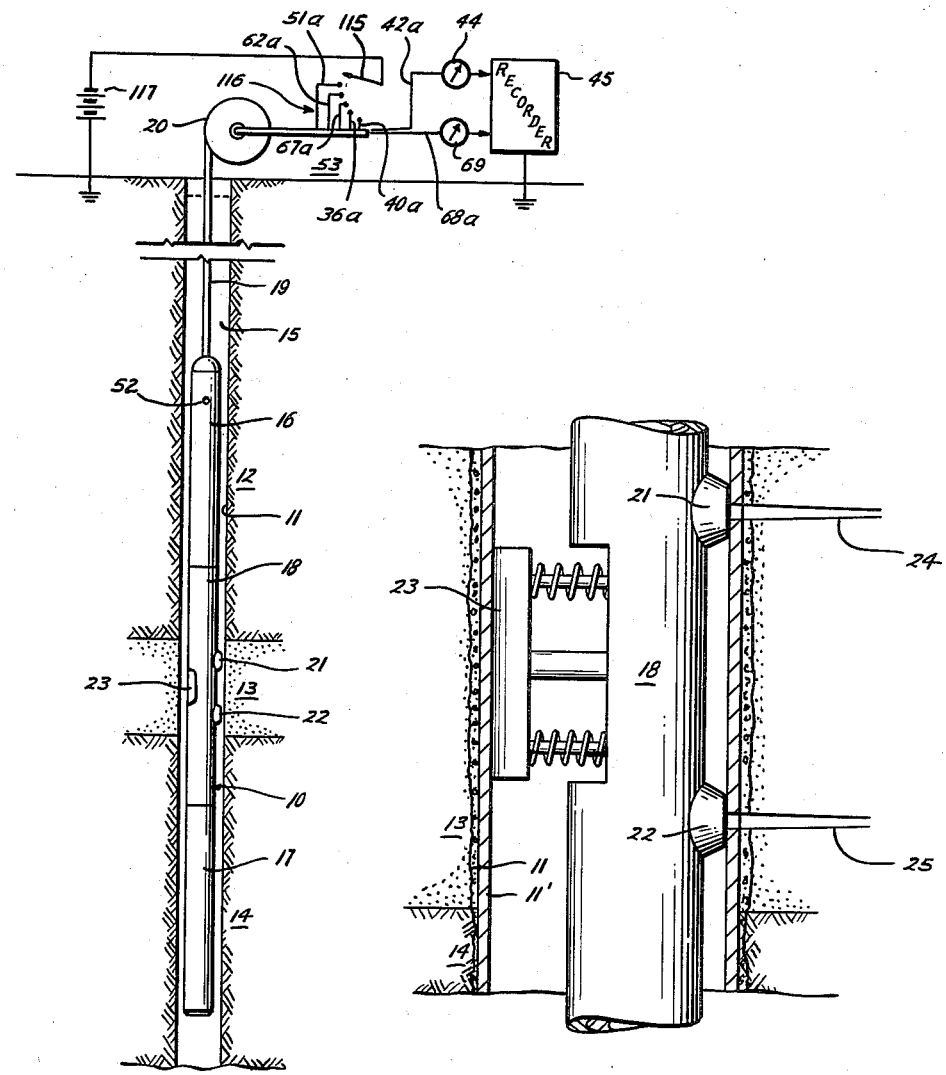
FIG. 1 is a diagrammatic view in elevation of a fluid sampling apparatus embodying the present invention and shown disposed in a borehole.
FIG. 2 is an enlarged view of a portion of the apparatus, shown in an operative posiiton in a bore.

In FIG. 1 of the drawings, a formation sampling apparatus 10 is shown disposed in a smooth-walled bore 11, such as those found in hard rock formations, the bore 11 traversing earth formations 12, 13, 14 where the formation 13 is the one of interest from which a fluid sample is to be obtained. Bore 11 contains a fluid 15 to provide a hydrostatic control pressure for the well in a conventional manner. Apparatus 10 embodying the present invention is suspended in the bore 11 by a cable 19 connected to a winch 20 located at the surface of the earth, the winch and cable serving to lower and raise the apparatus in a customary manner.

The formation sampling apparatus 10 generally comprises upper and lower pressure resistant housing sections 16 and 17 connected together in longitudinally spaced relation by a testing section 18. Upper section 16 generally contains hydraulic motive means for the testing section while lower section 17 generally contains the sample-receiving means. The testing section 18 is provided with spaced fluid sample-admitting means 21, 22 extending outwardly from the section and disposed along the length of the section so as to lie in a central plane extending longitudinally of the testing section. Diametrically opposed from the sample-admitting means 21, 22 is a wall-engaging member 23 mounted so as to move between a retracted position and an extended position.

While an open bore is shown in FIG. 1, it will be appreciated that the bore may be cased. Thus, as shown in FIG. 2, bore 11 may be provided with a casing 11' suitably cemented to the bore and, in the extended position of the wall-engaging member 23 shown, the fluid sampling means 21, 22 are in sealing engagement with the wall of the casing 11'. In this position, explosive means in the testing section which are associated with the sampling means 21, 22 may be employed to perforate the formations thereby permitting fluids from the earth formation to flow into the testing section 18. It will be noted that the dual perforations 24, 25 produced by the explosive means are spaced in depth along the bore thereby permitting an interval along the formations to be sampled. Thus, a greater area of the earth formations is sampled which decreases the possibilities of missing a permeable zone and increases the reliability of obtaining a fluid sample at a testing level.

Figure 3:
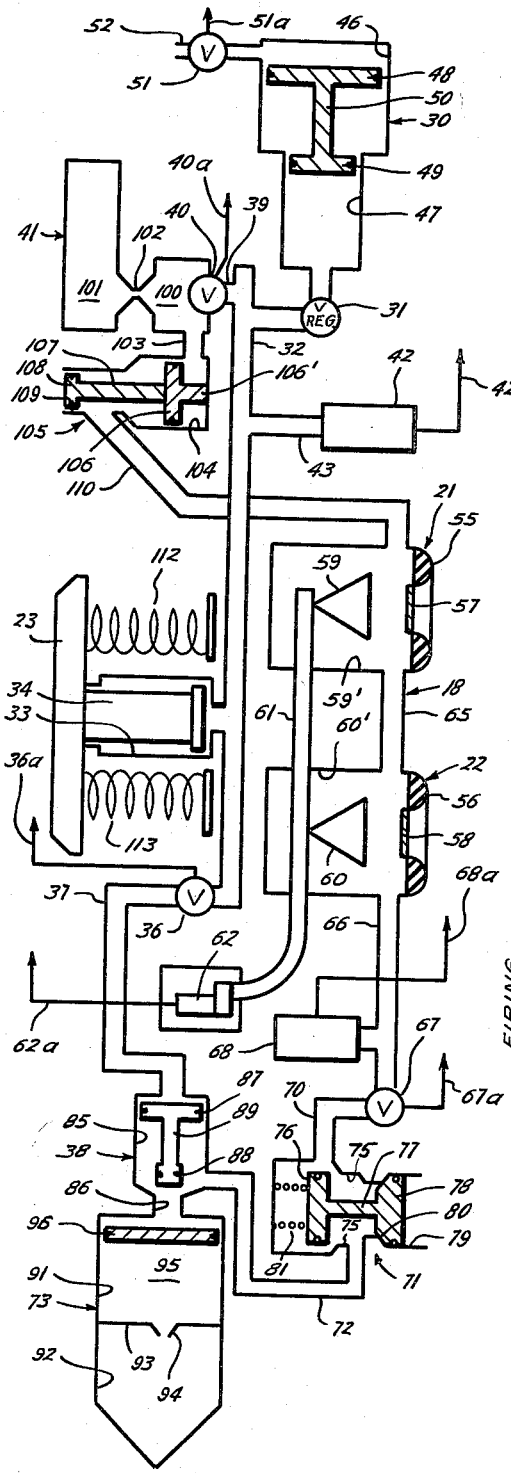
FIG. 3 is a diagrammatic illustration of the operating portions of the fluid sampling apparatus, which are arranged for lowering in a well.

Referring now to FIG. 3, the operational components of the apparatus 10 are diagrammatically illustrated to show more clearly the overall relationship and operation of the various components of the apparatus.

In the first step of operation, the fluid sampling means 21, 22 must be placed in sealing engagement with the bore or casing wall. To attain the sealing engagement, the wall-engaging member or back-up shoe 23 is moved relative to testing section 18 by means of a hydraulic system which includes a hydraulic pressure means 30 connected through a pressure regulating valve 31 to a high pressure conduit 32, the conduit 32 opening into a cylinder 33 in the testing section 18. A piston 34 is slidably and sealingly received in cylinder 33 and has an end portion secured to the wall-engaging member 23 so that, when the pressure means 30 is actuated, the piston 34 travels outwardly from the testing section 18 by virtue of hydraulic pressure applied to the fluid medium in the hydraulic system. The wall-engaging member 23 upon engaging the bore wall permits the pressure to urge sampling means 21, 22 into sealing engagement along the length of the bore wall.

Conduit 32 at its lower end is blocked by a normally closed break-valve 36 which, when open, serves to couple the high pressure conduit 32 through another conduit 37 to a seal valve 38. This function will be more fully explained in the description to follow in the proper sequence of operation.

It is, of course, also necessary to provide for reduction of the hydraulic pressure when it is desired to retract the wall-engaging member 23 and this will be more fully explained in the description to follow, it being sufficient to note that the upper end portion of conduit 32 has an extension 39 leading to a normally closed dump-valve 40, the valve 40 blocking the conduit 32 from a dump chamber 41.

To provide indications of the pressure of the hydraulic system, a pressure transducer 42 is connected by a conduit extension 43 to the conduit 32. Transducer 42 is adapted to produce electrical signals in response to pressure changes and a conductor 42a connected to the transducer 42 passes through the cable 19 to conventional indicating means 44 (FIG. 1) and a conventional recorder 45 which provides indications of the pressure of the hydraulic system.

Of the foregoing portions of the described apparatus, pressure means 30, regulating valve 31, dump chamber 41, break-valve 40 and transducer 42 are located in upper housing 16 (FIG. 1) of the apparatus 10. These components are described in further detail in the copending application Serial No. 560,710, now U.S. Patent No. 3,011,554, of R. L. Desbrandes and R. Q. Fields which is assigned to the assignee of the present invention. However, by way of general explanation, it will be noted (FIG. 3) that pressure means 30 includes upper and lower cylinders 46, 47 of different diameters which respectively slidably and sealingly receive upper and lower pistons 48, 49, the pistons being interconnected by a longitudinally extending rigid member 50. Upper cylinder 46 is connected to a normally closed break-valve 51 which has an opening 52 to the exterior of the housing section 16 (FIG. 1) so that, when actuated, bore fluid may enter the upper end portion of cylinder 46 via valve means 51. Valve 51, which will subsequently be more fully explained, is adapted to be actuated by electrical energy supplied via a conductor 51a which passes through the cable 19 to surface control equipment 53 (FIG. 1). Thus, when bore fluid 15 under hydrostatic fluid pressure enters cylinder 46, piston 48 moves downwardly so that the interconnected piston 49 in cylinder 47 also moves downwardly thereby compressing fluid in the hydraulic system. Because of the smaller diameter of piston 49 and cylinder 47, the pressure means 30 acts as a pressure multiplier thereby increasing the pressure in the cylinder 47 many times greater than the hydrostatic pressure. Regulator valve 31 in conduit 32 functions to limit the pressure in conduit 32 to a predetermined value regardless of the hydrostatic pressure in the well thereby preventing pressures in excess of the pressure rating of the system.

In the testing section 18 are the sampling means 21, 22 which include annular sealing pads 55, 56 disposed over thin-walled portions 57, 58 and shaped charge explosive means 59, 60 disposed in chambers 59', 60'. Shaped charges 59, 60 are connected to igniter means such as a primacord 61 and a blasting cap 62, the blasting cap being ignitable upon receipt of electrical energy from the control equipment 53 (FIG. 1) via a conductor 62a in cable 19. Hence, it may be appreciated that when the sealing pads 55, 56 are in sealing engagement with the bore wall and the shaped charges 59, 60, are detonated, perforations will be produced in adjacent earth formations thereby permitting formation fluids to flow through the perforated wall portions 57, 58 into the chambers 59', 60'.

Chambers 59', 60' are interconnected by means of a conduit 65 for fluid communication while the lower chamber 60' is connected by a conduit 66 to a normally closed break-valve 67. Valve 67 is provided with an electrical conductor 67a extending through the cable 19 to the surface control means 53. Also connected to the conduit 66 is a pressure transducer 68 which corresponds in construction to transducer 42 and serves to derive indications of the pressure in the conduit 66 which is, of course, representative of the pressure of the fluids in the earth formations. Transducer 68 is similarly connected by a conductor 68a to indicating means 69 (FIG. 1) at the surface of the earth and also to the recorder 45. Thus, it will be appreciated that when the fluid sampling means 21, 22 are opened to admit a fluid sample, the initial pressure of the fluids in the formations is sensed by the pressure transducer 68 and is recorded by the surface indicating equipment.

Valve 67 when opened connects conduit 66 to a conduit 70 which opens into a safety valve 71 which, in turn, is connected by a conduit 72 to the seal valve 38. Seal valve 38 opens into a sample-receiving device 73. Hence, when valve 67 is opened, formation fluids may flow via conduit 70, valve 71, conduit 72 and seal valve 38 to the sample-receiving device 73. Of course, the pressures of flowing sample fluids may be continuously sensed by the pressure transducer 68.

Safety valve 71 includes a cylinder 75 and sealing piston 76 adapted to cooperate with cylinder 75 to block fluid flow between conduits 70 and 72 whenever the fluid sample becomes contaminated with bore fluid 15 due to leakage by seal pads 55 or 56 or, in event that the seal valve malfunctions, the valve 71 also prevents escapement or contamination of the sample as the tool comes out of the hole. Piston 76 is connected by a rigid member 77 to another sealing piston 78 with a corresponding diameter which is slidably received in cylinder or bore 79. The bore 79 is provided with a tapered seat 80 at one end and opens to the exterior of the testing section 18 at its other end so that the hydrostatic pressure of the well fluid is applied to one side of piston 78 while the pressure of the formation fluids is applied to the other side of the piston. Since the well fluid pressure is always calculated to be greater than the formation fluid pressure (to insure proper control of the well), the piston 78 is urged to the left to unblock conduit 72 and permit formation fluids to pass through the valve. A spring 81 is provided between a face of piston 76 and a wall of the testing section and is normally compressed when the pressure of the well fluid exceeds the pressure of the formation fluid. Thus, if the sealing members 55, 56 or any other part of the apparatus should leak, i.e., admit quantities of bore fluid 15, the pressure will be balanced across piston 78 so that the force of spring 81 will move the piston 76 into cylinder 75 thereby blocking off conduit 72 from conduit 70. Hence, it will be readily apparent that if the sealing members or any other part of the apparatus should fail to hold a seal during a test, the fluid sample already recovered will be substantially free of contamination by the bore fluid thus, the recovered sample will provide valuable results in spite of a malfunction.

Seal valve 38 is detailed and described in the aforesaid Fields and Desbrandes application and generally includes upper and lower cylinders 85, 86 which are adapted to respectively receive an upper sealed piston 87 and a lower sealed valve head 88, the piston 87 and head 88 being interconnected by a rigid member 89. In the normal position of the seal valve 38, the piston 87 is in an upward position in cylinder 85 so that the valve head 88 is not blocking cylinder 86 thus permitting a fluid sample to flow between conduit 72 and the sample-receiving device 73. To operate the seal valve 38 to close off the sample-receiving device 73, the upper end of cylinder 85 is connected by conduit 37 to the normally closed valve 36 in the high pressure conduit 32. Valve 36 has a conductor 36a extending through cable 19 to the surface control means 53. Thus, when valve 36 is opened, high pressure is applied to piston 87 moving it downward so that piston 88 enters cylinder 86 to pressure seal the opening to the sample-receiving device 73 thereby preventing further fluid flow into the device.

Sample-receiving device 73 is described and detailed in the aforesaid patent to L. M. Chambers and generally includes upper and lower chambers 91, 92 separated by a partition 93 having a flow restricting orifice 94. A fluid 95 such as water is disposed in the upper chamber 91 and separated from the cylinder 86 by a floating piston 96 which is initially positioned in the upper end of the chamber 91. Lower chamber 92 is filled with air, the piston 96 being held in position by frictional forces of piston sealing means such as O rings. Hence, formation fluids entering cylinder 86 move piston 96 downwardy at a rate determined by the flow of fluid through orifice 94.

After a sample has been obtained, to retrieve the apparatus 10, it is necessary to disengage the wall-engaging member 23 and sealing pads 55, 56 from the bore. Dump valve 40 is provided with a conductor 40a extending through cable 19 to the surface control means 53 and when dump valve 40 is actuated by the surface control means 53, the fluid in the hydraulic system is permitted to flow into dump chamber 41. Chamber 41 is constructed with a sufficient volume to receive the hydraulic fluid of the pressure system thereby to reduce to a small value the pressure on the fluid in the system. Dump chamber 41 includes a first chamber 100 and a second chamber 101 which are interconnected by a flow restricting orifice 102. First chamber 100 is connected by a conduit 103 to the rearward end of a cylinder 104 of a pressure equalizing valve 105. A piston 106 is slidably and sealingly received in cylinder 104 and spaced from an end wall of the cylinder by an extension 106'. Another piston 108 of smaller diameter is slidably received in a bore 109 and has an extension 107 in abutment with piston 106. Bore 109 extends between cylinder 104 and the exterior of the testing section so that the bore fluid 15 acts upon the piston 108 to urge it inwardly toward cylinder 104, the piston 108 preventing bore fluid from entering bore 109.

A channel 110 extends between bore 109 and the upper chamber 59' of the sampling means 21. When dump valve 40 is opened the orifice 102 momentarily restricts the relief of the pressure and permits a surge of pressure to be applied to piston 106 to move the piston 106 to the left so that piston 108 is moved out of bore 109. Extension 107 of piston 108 is of lesser diameter than piston 108 to permit bore fluid to flow into channel 110. In the just-described position, means are provided to retain the position of the piston which will hereinafter be more fully explained. Thus, in the open position of piston 108, bore fluid 15 is permitted to enter cylinder 109 and pass through channel 110 to the chambers 59', 60' of the sample-receiving means 21, 22 and the pressure across the sealing pads 55, 56 is equalized to facilitate removal of the sealing pads from the bore wall.

When the hydraulic pressure in conduit 32 is reduced, the pressure of the well fluid becomes greater than the pressure of the hydraulic system and serves to urge the well-engaging member 23 towards a retracted position. To facilitate the retraction of member 23 should it stick to the wall of the bore, heavy springs 112, 113 are connected between the member 23 and testing section, the springs being tensioned in the extended position of the member 23 so that the force of the springs tends to move member 23 inwardly towards a retracted position.

Referring now to FIG. 1, the surface control apparatus 53 includes a movable contact arm 115 for a multicontact switch 116, the contacts of which are connected, in counterclockwise fashion, to conductors 51a, 62a, 67a, 36a and 40a which correspond to the conductors in the apparatus 10 as previously described. Contact arm 115 is connected to a source of electrical energy 117 whereby the various electrical circuits in the apparatus may be supplied with electrical power.

In operation, the apparatus 10 is lowered in the bore 11 to the level to be tested by means of the cable 19 and winch 20 as shown in FIG. 1. Movable arm contact 115 is then moved counterclockwise to supply electrical energy via conductor 51a to actuate the valve 51 in housing section 16. Thus, valve 51 is opened thereby permitting bore fluid 15 to actuate the pressure means 30 and produce amplified hydraulic pressure for the hydraulic system. The pressure of the fluid in the hydraulic system is regulated by regulating valve 31 and applied via conduit 32 to the cylinder 33 containing piston 34 which moves the wall-engaging member 23 relative to the testing section 18 until the pad members 55, 56 of the fluid sampling means 21, 22 sealingly engage the wall of the bore (see FIG. 2). It will be noted that dump valve 40 and valve 36 associated with conduit 32 are normally closed.

Figure 4:
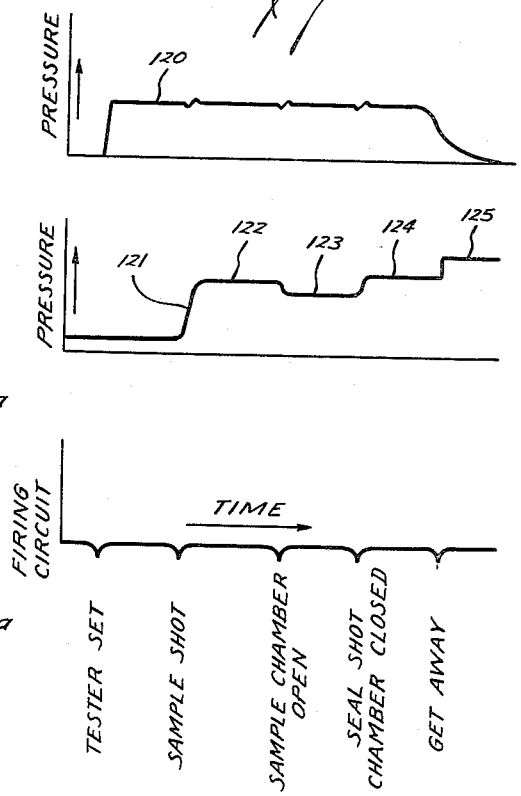
FIG. 4 illustrates graphically the time sequence of operation and the information relative to the formations which may be obtained by the present invention.

As the sealing pads 55, 56 of the fluid sampling means 21, 22 move into sealing engagement with the bore wall 11, the pressure in the hydraulic system increases to the maximum value of the hydraulic system. The pressure of the hydraulic system is sensed by the pressure responsive means 42 and recorded on the log (FIG. 4) as indicated by the numeral 120.

Thereafter, the shaped charges 59, 60 in the testing section 18 are detonated by connecting the electrical energy source 117 to conductor 62a and the earth formations are perforated as typically shown at 24 and 25 in FIG. 2. The thin wall portions 57, 58 are opened by the explosive means so that formation fluids may flow into the chambers 59', 60' of the testing section 18 and into conduits 65, 66 to the normally closed valve 67. At this time, the pressure of the formation fluids is built up in the testing section 18 and is sensed by the pressure responsive means 68 to provide an indication of the initial pressure characteristic of the formation fluids over a period of time. The indication obtained of build-up pressure is represented by the numeral 121 in FIG. 4 while the pressure characteristic is indicated by numeral 122.

After a suitable time has elapsed to provide the indication of the formation pressure, the conductor 67a is connected to the source of electrical energy 117 to open valve 67 thereby permitting the fluid to flow into the sample-receiving device 73 via conduit 70, safety valve 71, conduit 72 and seal valve 38. The pressure of the flowing fluids is recorded and represented by the numeral 123 in FIG. 4. As the sample chamber 91 receives the formation fluids, the floating piston 96 is moved downwardly thereby displacing the cushioning fluid 95 below it through orifice 94 into the lower chamber 92.

If, at any time, the seal of the pads 55 or 56 fails or bore fluid 15 otherwise is admitted into conduit 66, the pressure across piston 78 in safety valve 71 will be balanced so that spring 81 will urge piston 76 into cylinder 75 thereby closing off the sample flow path and preventing contamination of the fluid sample already obtained.

After a suitable time has elapsed to obtain the fluid sample, the source of electrical energy 117 is connected to conductor 36a to open valve 36. Valve 36 couples the pressure of the hydraulic system to the seal valve 38 so that the piston 87 of the seal valve means is actuated moving the piston 88 into the bore 86 thereby closing the sample-receiving chamber 91. If the sample chamber 91 fills up, a final pressure reading will be obtained before closing the seal valve, however, in the event the chamber 91 does not fill up in a certain length of time, the closing of the seal valve 38 permits a final pressure reading of the formation to be obtained by the transducer 68 which is indicated by the numeral 124 in FIG. 4.

Thereafter, the source of electrical energy 117 is connected to conductor 40a and the dump valve 40 is actuated to reduce the hydraulic pressure of the system. The orifice 102 retards the reduction of pressure so that a surge of hydraulic pressure is applied to the pressure-equalizing valve 105 via conduit 103 to move the pistons 106 and 108 to the left thereby unblocking bore 109 and permitting bore fluid 15 to enter conduit 110 to the sample-receiving means 21 and 22. Thus, the pressure-equalizing valve permits the pressures across the sealing pads 55, 56 to be equalized. The pressure of the bore fluid 15 is also sensed by the pressure-responsive means 68 and produces an indication, shown by the numeral 125 of the pressure of the bore fluid.

As the pressure of the hydraulic system decreases, the pressure of the bore fluid 15 urges member 23 towards a retracted position, this movement being assisted by springs 112 and 113 which were tensioned in the extended position of member 23. When member 23 is completely retracted, apparatus 10 is retrieved from the bore and the collected sample analyzed.

Referring now to FIGS. 5A and 5B for more details of the present invention in all of its aspects which are embodied in testing section 18, the section is comprised of an elongated generally cylindrical support member 18a (FIG. 8) which houses, from top to bottom, pressure equalizing valve 105 (FIG. 5A), fluid-receiving means 21, wall-engaging member 23, fluid-receiving means 22, pressure transducer 68 (FIG. 5B), break valve 67 (FIG. 5B) and safety valve 71 (FIG. 5B).

The novel pressure equalizing valve 105 includes a transverse bore or cylinder 104 in housing 18a which, at one end, is spaced from an end wall 126 by an annular recess 127. At the other end of bore 104 is a counterbore 128 and spaced from the counterbore by an annular recess 129 is a threaded portion 130 having a diameter larger than that of the counterbore 128 but less than the diameter of recess 129. An annular housing 131 having a forward end portion 132 received and pressure sealed within counterbore 128 also has a main body portion threadedly secured to threaded portion 130, the threaded portion similarly being pressure sealed with respect to the housing 131. The main body portion of housing 131 has a bore or cylinder 109 opening to the exterior of the housing which extends inwardly to a bore 133 of smaller diameter located in the forward end portion 132. A tapered groove 134 is cut in bore 133 to form a locking groove for a snap ring 135 received in a groove in the extension member 107. Member 107 is slidably received by bore 133 and is threadedly secured at one end to a spool type piston 108 which is slidably and sealingly received by cylinder 109. The remaining end of member 107 has a cylindrical extension 136 of smaller diameter than extension 107 which is slidably received in a central bore in piston 106, the piston 106 being slidably and sealingly received by cylinder 104. Piston 106 also has a cylindrical extension 106' which spaces the piston from the end wall 126 to facilitate the access of fluid under pressure from the conduit 103 which opens into the spacing between the piston 106 and end wall 126.

Spool piston 108 has an annular recess 138 intermediate piston portions at each end of the piston while bore 109 has an annular recess 139 intermediate the ends of the bore, the recesses 138, 139 cooperating to form an annular chamber. Housing 131 is provided with openings 141 to interconnect the aforesaid annular chamber to the annular recess 129. Recess 129 is connected by a passageway 110 in the housing to the sampling means 21.

From the foregoing details of the pressure equalizing valve, the operation thereof becomes readily apparent. The hydrostatic pressure of the bore fluid 15 urges piston 108 inwardly into the housing so that the extension 106' of piston 106 abuts end wall 126 and the pressure seal of the piston 108 prevents well fluid from entering the system at this time. The piston portions of piston 108 disposed on either side of recess 138 present a pressure-balanced arrangement so that the pressures generated by the shaped charges will not actuate or move the piston 108. However, when a high pressure is provided in passage 103 between piston 106 and end wall 126, the piston will move to the left and the snap ring 135 locks in groove 134. At this time, the forward piston portion of piston 108 extends outwardly beyond the bore 109 so that recess 138 and recess 139 permit the bore fluid 15 to pass via openings 141 in the housing 131 to recess 129 and passageway 110. The locking action of the snap ring holds the piston 108 in this position. Piston 106 is free to move relative to member 107 after member 107 has been locked in position so that the snap ring does not have to withstand any substantially shearing forces and thus the piston 106 will be positioned in bore 104 as determined by the pressure differential across the piston. If desired, extension 107 may have a bypass port (not shown) extending to either side of the snap ring 135.

Sampling means 21 and 22 are identical so that description of one will suffice for the other. Chamber 59' is formed by a transverse bore 150 of relatively large diameter so as to accommodate explosive means 59. One end of bore 150 threadedly receives a cap member 151 which has a rearward externally threaded portion 152 separated by an annular recess 153 from a rim-like flange portion 154 which has a larger diameter than the threaded portion 152, the flange portion 154 being received on a flat surface 155 milled on the housing. An O-ring 156 in one side of the flange pressure seals the member 151 relative to the housing.

Flange 154 has a connecting portion 157 which is offset relative to the rim-like peripheral portion of the flange to form an annular dished portion about a bulb-shaped extension 158 which extends centrally and outwardly from the portion 157. Extension 158 has a forward portion 159 which is enlarged relative to the intermediate portion which adjoins the connecting portion 157. The annular sealing element or pad 55 is received over the extension 158, the pad conforming to the extension as well as the connecting and rim portions and is secured to the extension 158 by elastic forces about the intermediate portion of extension 158.

Sealing pad 55 is a ring-like member having substantially flat annular portions 160, 161 on one side of the pad, the other side of the pad having a curvature "C" (FIG. 7) which is similar to the curvature of the bore wall on which the pad will be positioned. In cross section, the outer and inner surfaces 162, 163 of the ring generally curve towards one another from the flat surfaces 160, 161 to form a rounded forward portion 164. To insure proper orientation of the curvature "C" of the element relative to the curvature of the bore, a rectangular tab portion 165 (FIG. 6) extends outwardly from the circumference of the element and is arranged to be received by a rectangular slot 166 in the housing. The forward portion 164 of the pad element 55 extends outwardly of the housing 18a a sufficient distance to permit compression when in engagement with the bore wall yet permit spacing of the housing from the bore wall.

The forward end 167 of extension 158 is spaced intermediate of the forward portion 164 of the sealing element 55 and the housing 18a so as to permit compression of the element 55 until the end 167 contacts the bore wall. Extending inwardly from the forward end 167 of extension 158 is a recess formed by a circular wall 160a tapering inwardly from the forward end 167 towards a longitudinal axis of the extension 158 to a bottom wall portion 168. A central bore 169 extends along the longitudinal axis of the member 151 and adjoins, at one end, a bore 170 of smaller diameter. The other end of bore 169 is threaded to receive a sealing cap member 171 having a central thin-walled portion 57 (FIG. 7). Bore 170 opens into a conically-tapered wall portion 172 which extends outwardly from the bore 170 to the end surface 173 of member 151. A plurality of radial passageways 173 are provided to interconnect bore 169 with the recess 153.

Shaped charge 59 includes a relatively thick-walled container 175 having a forward conically-tapered wall portion 176 adapted to cooperate with the conically-tapered wall portion 172 of the member 151 to centrally locate the container relative to bore 170. Container 175 has a concavity 176' which receives a shaped explosive charge 177 and a fitted conically shaped metallic liner 178. The charge 177, when detonated, is adapted to produce a perforation "jet" in a customary manner and the diameter of bore 170 is made large enough to pass the "jet" yet retain the debris of the container 175. To detonate the explosive charge, a booster charge and primacord 61 are employed in a well-known manner, the primacord fitting in a slot in the container 175 so as to be adjacent the booster charge which adjoins the main explosive charge 177. To insure the centering action of the container with respect to member 151, a spring clip 180 (FIG. 7) is fitted to the rear end of the container and has bowed arm portions 181, 182 in contact with an annular projection 183 at the end of bore 150. A cap member 184 is threadedly and sealingly received in bore 150. The charge container 175, housing 18a, cap member 184 and member 151 are made of high-strength, high-impact steel such as heat treated SAE4340 steel. The "tough" material, of course, provides excellent resistance to the blasting effects of the explosive 177. By making the walls of the container relatively thick the container can be made to withstand the blasting effects and only crack or break into large pieces thus preventing undue wear on the bore 150. The walls of the container may be made relatively thinner by design to permit the container to break into smaller fragments and in this instance, a larger volume of air cushion between the bore 150 and container is provided to absorb the explosive effects.

By way of example, a container may have a 2" outside diameter with a 1⅛" inside diameter which adjoins a conical recess with a 40° vertex angle. With a 60° angle liner, a charge of 5½ to 6¼ grams of 98.2 percent RDX explosive may be employed and the container will only crack or break into large fragments. The explosive charge may be loaded under 3000 p.s.i. for thirty seconds. A smaller container, for example, with a 1½" outside diameter and ⅞" inside diameter adjoining a conical recess with a 46° vertex angle may contain 4 grams of 98.2 percent RDX and have a liner with a 60° vertex angle. The smaller container will break into smaller fragments and the diameter of bore 150 may be 2¼" to provide a sufficient air cushion about the container.

The sampling means 21 and 22 are interconnected by a passageway 65 (FIG. 6) which extends between the annular recess 153 of sampling means 21 to a corresponding annular recess 186 in sampling means 22. Primacord 61 which connects the shaped charges to the blasting cap is similarly passed through a passageway (not shown) to the container 187 in sampling means 22. Also, as shown in FIG. 6, the high pressure conduit 32 extends lengthwise of the housing 18a and has an opening 188 into cylinder 33.

As shown in FIGS. 5 and 8, cylinder 33 is a transverse bore in housing 18a which extends partially into a closure member 186a threadedly secured in the housing. A bore 190 at one end of cylinder 33 with a smaller diameter than cylinder 33 slidably and sealingly receives the piston 34. The end of the piston 34 in the cylinder 33 has an enlarged flange portion 191 which is suitably slotted to permit movement of fluid, the flange serving to limit outward movement of the piston. The other end of the piston 34 is threadedly secured to the wall-engaging member 23 in a manner permitting limited pivotal movement of the wall-engaging member relative to the piston. More specifically, piston 34 has a convex portion 34a adjacent to a concave portion 23a in member 23 while an opening 23b in member 23 is made larger than the shank of the screw 23c which secures member 23 to piston 34.

Wall-engaging member 23 is a semicircular plate member (FIG. 8) which is received in a recessed portion 192 of the housing 18a so as to reduce the overall diameter of the apparatus. Above and below piston 34 (FIG. 5A) the member 23 is secured to springs 112, 113, respectively, which are received in transverse openings 193, 194 in the housing and are suitably secured to the housing by securing caps at 195, 196.

The central axis of piston 34 is spaced intermediate of the central axes of the sample-admitting means 21, 22 so that the forces on the respective pad members 55, 56 are equal to one another and substantially equal to one-half of the force on piston 34. Since pad 23 is pivotal and the pad members 55, 56 of relatively small configuration, the housing may tilt so that each pad may independently seal with the bore wall and thus accommodate for irregularities in the bore wall. Of course, more than one piston may be used provided the forces are balanced with respect to the sealing pads. Also, in smooth wall casing, the wall-engaging member 23 need not be pivoted since the casing has a relatively uniform configuration.

In the lower portion of FIG. 5A, a cap member 197 is threadedly and sealingly received by the housing and closes off a small chamber 198. Chamber 198 permits the assembly of the blasting cap 62 to the primacord 61 to be facilitated. The blasting cap 62 is connected to a connector plug 199 in the housing 18a. Housing 18a has a conductor channel 200 (FIG. 8) extending longitudinally of the housing to receive the various necessary electrical conductors.

A passageway 66 extends longitudinally in housing 18a from recess 186 of sampling means 22 to the break valve 67 (FIG. 5B). Intermediate of the sampling means 22 and valve 67, the passageway 66 opens into a pressure chamber 201 which contains the pressure transducer 68.

Break valve 67 typically consists of a hollow closure member 202 sealingly received in a bore 203 which adjoins the conduit 66 and having a breakable wall portion 204 normally preventing fluid flow. The bore 203 opens into a larger diameter cylindrical chamber 205, the chamber being connected to the conduit 70. To open the closure member 202 and permit fluid flow between conduits 66 and 70, the member 202 has an extension 206 received by a bore in the end of a hammer member 207. Hammer member 207 has a main body portion slidably and sealingly received in a bore 208 and has an annular resilient bumper member 209 secured to a forward portion of the main body which is adapted to engage a shoulder 210 formed by a bore 211 of smaller diameter. Bumper member 209 serves to limit the forward motion of the hammer member. In the rearward portion of the main body of the hammer member is a cylindrical recess which receives an explosive charge 212. A conventional igniter needle 213 mounted in a cap member 214 extends into the charge and serves to ignite the same upon receipt of electrical energy over conductor 67a. The charge when ignited propels the hammer 207 into the weakened portion 204 of the closure 202, which opens the closure, the sheared off portion 204 being retained by the extension 206 in the hammer while the outer portion of closure 202 is forced to the left by formation pressure to open the passageway.

The passageway 70 opens into a bore 218 which threadedly and sealingly receives a cap member 219 at one end and is connected at its other end by a conically-tapered section 220 to a bore 75 of smaller diameter. Bore 75 is separated from a bore 79 of equal diameter by a bore 221 of smaller diameter, the transition sections between the bores 75 and 79 and bore 221 being conically tapered to form seats 80 and 222. Bore 79 opens to the exterior of housing 18a and slidably and sealingly receives a piston 78. Piston 78 is threadedly connected to a small diameter extension 77 which adjoins a piston 76. The length of extension 77 is such that when piston 78 engages seat 80, the piston 76 is free of bore 75 thereby permitting fluid from passageway 70 to flow in bores 75 and 221. A passageway 72 opens into bore 221 and is connected to the sample-receiving device 73 (see FIG. 3). One side of piston 76 has a cylindrical recess 223 which aligns with a cylindrical recess 224 in the cap member 219 so that a spring 81 may be positioned between the cap member and piston. Thus, if the pressure across piston 78 is equalized, the spring 81 will urge piston 76 into bore 75 thereby preventing fluid flow from conduit 70 to conduit 72.

In view of the several aspects of the present invention described with respect to FIGS. 5–8, the utility of the various features presented in obtaining the previously described overall operation will now be understood.

While particular embodiments of the present invention have been shown and described, it is apparent that changes and modifications may be made without departing from this invention in its broader aspects, and therefore the aim in the appended claims is to cover all such changes and modifications as fall within true spirit and scope of this invention.

What is claimed is:

1. In a borehole apparatus arranged for passage through a borehole, a support member adapted for passage through a bore containing well fluid to a level where a fluid sample is desired, said support member having a sample-receiving chamber, a plurality of sample-admitting means on said support member each including longitudinally aligned and spaced apart sealing rings for isolating and sealing off spaced locations along the bore; means in said support member for moving said sealing rings into sealing contact with a well bore, means in said support for placing said sample-admitting means in fluid communication with said sample-receiving chamber including an explosive chamber wherein one of the walls of the chamber is constructed to be perforated, a shaped charge device disposed in said explosive chamber including a hollow container constructed of a high-strength, high-impact material, and explosive material disposed in said container in confronting relationship to said one wall and adapted, upon detonation, to produce explosive forces including a perforating jet emanating from the open end of the container to perforate said one wall, a cylindrically shaped face plate member having a central axis, a first flange having a forward face and a bulb-like portion extending along said axis to one side of said forward face; an annular sealing member received by said bulb-like portion and having one end portion abutting said flange and the remaining end portion extending beyond the end of said bulb-like portion, said sealing member being constructed of elastic material having an inner surface conforming to the contours of said bulb-like portion thereby to fasten the annular member to the extension by elastic forces.

2. Fluid sampling apparatus comprising: a support member adapted for passage through a bore to a level where a fluid sample is desired, said support member having a sample-receiving chamber; a wall-engaging member mounted on said support member; means coupled to said members for developing relative movement of said members between a retracted position and an extended position into engagement with the sidewall of the bore; a plurality of sample-admitting means carried by one of said members, each sample-admitting means including an annular elastic sealing ring detachably coupled to said one member for isolating portions of the bore wall, said sealing rings being closely spaced in longitudinal alignment for testing an interval of earth formations along said bore; and means for placing said sample-admitting means in fluid communication with said sample-receiving chamber including a passageway.

3. Fluid sampling apparatus comprising: a support member adapted for passage through a bore to a level where a fluid sample is desired, said support member having a sample-receiving chamber; a wall-engaging member mounted on said support member; means coupled to said members for developing relative movement of said members between a retracted position and an extended position into engagement with the sidewall of the bore; a plurality of sample-admitting means carried by one of said members for testing an interval of earth formations along said bore, each of said sample-admitting means including an annular elastic sealing ring for isolating spaced, localized portions of the bore wall, said sealing rings being spaced apart in longitudinal alignment; means detachably coupling said rings to said one member; shaped charge means in said one member for perforating at least one of the portions of the bore wall isolated by said sealing rings; and a passageway for placing said sample-admitting means in fluid communication with said sample-receiving chamber.

4. The apparatus of claim 3 and further including first normally-closed valve means in said passageway; means for opening said first valve means, a second normally-open valve means in said passageway, said second valve means being disposed intermediate of said first valve means and said sample-receiving chamber, means for closing said second valve means, and pressure-responsive means in fluid communication with said passageway intermediate of said sample-admitting means and said first valve means for providing indications of pressure before and after the time at which the respective first and second valve means are actuated.

5. Fluid sampling apparatus comprising: a support member adapted for passage through a bore to a level where a fluid sample is desired, said support member having a sample-receiving chamber; a wall-engaging member mounted on said support member; means coupled to said members for developing relative movement of said members between a retracted position and an extended position into engagement with the sidewall of the bore; a plurality of sample-admitting means, each of said sample-admitting means including an annular elastic seating ring for isolating spaced, localized portions of the bore wall, said sealing rings being spaced apart in longitudinal alignment with respect to one another on one of said members for testing an interval of earth formations along said bore, said sealing rings being detachably coupled to said one member; means in said one member for placing such isolated portions of the bore wall in fluid communication with said sample-receiving chamber including independent shaped charges carried by said one member for perforating the portions of the bore wall isolated by said sealing rings, and a passageway for placing said sample-admitting means in fluid communication with said sample-receiving chamber; and means to detonate said shaped charges substantially simultaneously.

6. Fluid sampling apparatus comprising: a support member adapted for passage through a bore to a level where a fluid sample is desired, said support member having a sample-receiving chamber; a wall-engaging member mounted on said support member; means coupled to said members for developing relative movement of said members between a retracted position and an extended position into engagement with the sidewall of the bore; a plurality of sample-admitting means, each of said sample-admitting means including an annular elastic sealing ring for isolating spaced, localized portions of the bore wall, said sealing rings being spaced longitudinally from one another and detachably carried by said support member, said rings having a thickness sufficient to project portions of said rings outwardly from said support member for sealing contact with earth formations at spaced intervals along said bore; and means for placing said sample-admitting means in fluid communication with said sample-receiving chamber including a passageway.

7. Fluid sampling apparatus comprising: a support member adapted for passage through a bore to a level where a fluid sample is desired, said support member having a sample-receiving chamber; a plurality of sample-admitting means, each including annular sealing rings; means detachably coupling said sealing rings to said support member, said rings having a thickness sufficient to enable portions thereof to project outwardly of said support member, said rings being spaced apart in longitudinal alignment from one another on said support member and serving to isolate portions of the wall of the bore; a wall-engaging member mounted diametrically on said support member from said rings and disposed intermediate of the location of said sealing rings; means coupled to said members for developing relative movement of said members between a retracted position and an extended position wherein said rings are urged into engagement with the sidewall of the bore; shaped charge explosive means disposed in said support member centrally of said sealing rings; a passageway for placing said sample-admitting means in fluid communication with said sample-receiving chamber; and means to detonate said shaped charge means.

8. Fluid sampling apparatus comprising: a support member adapted for passage through a bore to a level where a fluid sample is desired, said support member having a sample-receiving chamber; a plurality of sample-admitting means, each of said sample-admitting means including a sealing ring, means detachably coupling said sealing rings to said support member, said rings having a thickness sufficient to enable portions thereof to project outwardly of said support member, said rings being spaced longitudinally from one another on said support member and serving to isolate portions of the wall of the bore, thin-wall closure portions disposed in said support member centrally of each of said sealing rings; a wall-engaging member diametrically mounted on said support member from said rings and disposed intermediate of the location of said sealing rings; means coupled to said members for developing relative movement of said members between a retracted position and an extended position wherein said rings are urged into engagement with the sidewall of the bore; shaped charge explosive means disposed in said support member in confronting relation of said thin-wall closure portions and adapted to perforate said wall portions, when detonated; a passageway for placing said sample-admitting means in fluid communication with said sample-receiving chamber; and means to detonate said shaped charge means.

9. Fluid sampling apparatus comprising: a support member adapted for passage through a bore to a level where a fluid sample is desired, said support member having a sample-receiving chamber; a plurality of sample-admitting means, each including annular sealing rings, means detachably coupling said sealing rings to said support member, said rings having a thickness sufficient to enable portions thereof to project outwardly of said support member, said rings being spaced apart in longitudinal relation to one another on said support member and serving to isolate portions of the wall of the bore, each of said sample-admitting means further including a hollow explosion chamber, a fluid inlet member constructed of high-strength, high-impact material disposed between said explosion chamber and said sealing rings, said inlet member having a central passageway, a thin wall closure member for closing said passageway, a shaped charge explosive means disposed in said explosion chamber having a container constructed of high-strength, high-impact material for the absorption of the explosive forces generated upon detonation of said shaped charge means, barrier means in said passageway to pass a perforating jet yet impede passage of debris from said container; a wall-engaging member diametrically mounted on said support member from said rings and intermediately of said sealing rings; means coupled to said members for developing relative movement of said members between a retracted position and an extended position wherein said rings are urged into engagement with the sidewall of the bore; and means in said support member for placing said central passageway at a location intermediate of said barrier means and said closure means in fluid communication with said sample-receiving chamber and said sample-admitting means.

10. Fluid sampling apparatus comprising: a support member adapted for passage through a bore containing well fluid to a level where a fluid sample is desired, said support member having a sample-receiving chamber; a wall-engaging member mounted on said support member for movement between a retracted position and an extended position in engagement with the sidewall of the bore; a plurality of sample-admitting means on one of said members for isolating and testing a location along the bore; hydraulic actuating means providing fluid pressure for moving said members relative to one another to an extended position; means in said one member for placing said sample-admitting means in fluid communication with said sample-receiving chamber including a first passageway extending between said sample-receiving chamber and said sample-admitting means; normally-closed first valve means in said passageway; a pressure-responsive means in fluid communication with said first passageway intermediate of said sample-admitting means and said normally-closed first valve means for providing indications of pressure before and after the time at which said normally-closed first valve means is opened; means for opening said first valve means; a second fluid passageway extending between the well fluid exterior of said support member and said sample-admitting means; and normally-closed balance valve means disposed in said second passageway, means for opening said balance valve means responsive to a release of said hydraulic actuating means when said members are in an extended position to admit well fluid to said sample-admitting means.

11. Fluid sampling apparatus comprising: a support member adapted for passage through a bore containing well fluid to a level where a fluid sample is desired, said support member having a sample-receiving chamber; a wall-engaging member mounted on said support member for movement between a retracted position and an extended position in engagement with the sidewall of the bore; a plurality of sample-admitting means on one of said members for isolating a location along the bore; hydraulic actuating means providing a fluid pressure for moving said members relative to one another to an extended position; a first passageway for placing said sample-admitting means in fluid communication with said sample-receiving chamber, first, normally-closed valve means in said first passageway; means for selectively opening said first valve means; second, normally-open valve means in said first passageway, said second valve means being disposed intermediate of said first valve means and said sample-receiving chamber; means for selectively closing said second valve means; pressure-responsive means in fluid communication with said first passageway intermediate of said sample-admitting means and said first valve means to provide indications of pressure before and after the time at which said first passageway is opened; means for releasing the fluid pressure of the hydraulic actuating means; and means providing fluid communication path extending between the well fluid exterior of said support member and said sample-admitting means and including third, balance valve means normally preventing fluid flow therethrough, means for placing said third, balance valve means in fluid communication with said pressure releasing means, said balance valve means being responsive to operation of said pressure relieving means to open said fluid communication path for fluid flow.

12. Fluid sampling apparatus comprising: a support member adapted for passage through a bore containing well fluid to a level where a fluid sample is desired, said support member having a sample-receiving chamber; a wall-engaging member mounted on said support member for movement between a retracted position and an extended position into engagement with the side-wall of the bore; sample-admitting means on one of said members for isolating a location along the bore; hydraulic actuating means providing a fluid pressure for moving said members relative to one another to said extended position; means in said one member for placing said sample-admitting means in fluid communication with said sample-receiving chamber; means for releasing the fluid pressure in the hydraulic actuating means when said members are in said extended position; means for selectively placing said sample-admitting means in fluid communication with the well fluid exterior of said support member including normally-closed balance valve means, and means for opening said balance valve means in response to operation of said fluid pressure release means when said members are in an extended position to admit well fluid to said sample-admitting means.

13. Fluid sampling apparatus comprising: a support member adapted for passage through a bore containing well fluid to a level where a fluid sample is desired, said support member having a sample-receiving chamber; a wall-engaging member mounted on said support member for movement between a retracted position and an extended position into engagement with the sidewall of the bore; sample-admitting means on one of said members for isolating a location along the bore; hydraulic actuating means providing fluid pressure for moving said members relative to one another to an extended position; means in said one member for placing said sample-admitting means in fluid communication with said sample-receiving chamber; means for selectively releasing the fluid pressure of the hydraulic actuating means including a low-pressure dump chamber in said support member and normally-closed dump valve means which when opened releases the fluid pressure to said low-pressure dump chamber; and means for placing said sample-admitting means and the well fluid exterior of said support member in fluid communication including normally-closed balance valve means; means for placing said balance valve means in fluid communication with said releasing means, said balance means being responsive to operation of said releasing means to open said balance valve means thereby to admit well fluid to said sample-admitting means.

14. In a fluid sampling apparatus, the combination comprising: support means having a bore opening to its exterior, a first passageway opening into the rearward portion of said bore and a second passageway opening into an intermediate portion of said bore, a first piston disposed in a first position in the rearward portion of said bore intermediate of said first and second passageways, a second piston normally disposed in a first position in the forward portion of said bore intermediate of the exterior opening of said bore and said rearward portion of said bore, said second piston having an end portion thereof sealingly interposed between the exterior opening of said bore and second passageway, said second piston having an annular recess intermediate of its end portions, a spacer member connected to one of said pistons and abutting the other piston to space said pistons from one another whereby said first and second pistons may be displaced to a second position upon the application of pressure via said first passageway, said second piston in said second position opening said second passageway to the exterior of said support means via said annular recess, and means to secure said second piston in said second position.

15. In a fluid sampling apparatus, the combination comprising: a support member adapted for passage through a bore containing well fluid to a level where a fluid sample is desired, said support member having a sample-receiving chamber; a wall-engaging member mounted on said support member for movement between a retracted position and an extended position into engagement with the sidewall of the bore; a plurality of sample-admitting means on one of said members for isolating certain locations along the bore; hydraulic actuating means providing fluid pressure for moving said members relative to one another to said extended position; means in said one member for placing said sample-admitting means in fluid communication with said sample-receiving chamber including a passageway and a chamber which is disposed adjacent said sample-admitting means and wherein one of the walls of the chamber disposed centrally of said sample-admitting means is constructed to be perforated; a shaped charge explosive means disposed in said chamber including a hollow container having wall portions thick enough for absorption of explosive forces to fragment in relatively large pieces and constructed of a high-strength, high-impact material; explosive charge means disposed in said container in confronting relationship to said one wall and adapted, upon detonation to produce explosive forces including a perforating jet emanating from the open end of the container to perforate said one wall; normally-closed first valve means in said passageway; means for opening said first valve means, pressure-responsive means coupled to said passageway intermediate of said sample-admitting means and said first valve means to provide indications of pressure before and after the time at which said first valve means is opened; means for releasing the fluid pressure of the hydraulic actuating means; and means providing a fluid communication path between the bore fluid exterior of said support member and said sample-admitting means and including normally-closed balance valve means; means for placing said balance valve means in fluid communication with said releasing means, said balance valve means being responsive to operation of said releasing means to open said balance valve means and admit well fluid to said sample-admitting means.

16. In a fluid sampling apparatus, the combination comprising: a support member adapted for passage through a bore containing well fluid to a level where a fluid sample is desired, said support member having a sample-receiving chamber; a wall-engaging member mounted on said support member for movement between a retracted position and an extended position in engagement with the sidewall of the bore; a plurality of sample-admitting means on one of said members for isolating certain locations along the bore; hydraulic actuating means providing fluid pressure for moving said members relative to one another to an extended position; means in said one member for placing said sample-admitting means in fluid communication with said sample-receiving chamber including a passageway and a chamber wherein one of the walls of the chamber is constructed to be perforated; a shaped charge explosive means disposed in said chamber, said explosive means including a hollow container having wall portions thick enough for absorption of explosive forces to fragment in relatively large pieces and constructed of a high-strength, high-impact material, said explosive charge means being disposed in said container in confronting relationship to said one wall and adapted, upon detonation, to produce explosive forces including a perforating jet emanating from the open end of the container to perforate said one wall; first, normally-closed valve means in said passageway; means for opening said first valve means; second, normally-open valve means in said passageway, said second valve means being disposed intermediate of said first valve means and said sample-receiving chamber; means for closing said second valve means; a pressure-responsive means coupled to said passageway intermediate of said sample-admitting means and said first valve means to provide indications of pressure before and after the time at which said first valve means is opened; means for releasing the pressure of the hydraulic actuating means; means providing a fluid communication path between the well fluid exterior of said support member and said sample-admitting means and including normally-closed balance valve means; means for placing said balance valve means in fluid communication with said releasing means, said balance valve means being responsive to operation of said releasing means to open said balance valve means and admit well fluid to said sample-admitting means.

17. In a borehole apparatus arranged for passage through a borehole, a support member adapted for passage through a bore containing well fluid to a level where a fluid sample is desired, said support member having a sample-receiving chamber, a wall-engaging member mounted on said support member for movement between a retracted condition and an extended position into engagement with the sidewall of the bore, a plurality of sample-admitting means on one of said members for isolating spaced locations along the bore when said wall-engaging member is in an extended position, hydraulic means coupled to said members for moving said members relative to one another, means in said one member for placing said sample-admitting means in fluid communication with said sample-receiving chamber including a passageway and an explosive chamber wherein one of the walls of said explosive chamber is constructed to be perforated, a shaped charge device disposed in said explosive chamber including a hollow container constructed of a high-strength, high-impact material, and explosive materials disposed in said container in confronting relationship to said one wall and adapted, upon detonation, to produce explosive forces including a perforating jet emanating from the open end of the container to perforate said one wall, a cylindrically-shaped face plate member having a central axis, a first flange having a forward face and a bulb-like portion extending along said axis to one side of said forward face; an annular sealing member received by said bulb-like portion and having one end portion abutting said flange and the remaining end portion extending beyond the end of said bulb-like portion, said sealing member being constructed of elastic material having an inner surface conforming to the contours of said bulb-like portion thereby to fasten the annular member to said bulb-like portion by elastic forces, normally-closed first valve means in said passageway, means for opening said first valve means, pressure-responsive means in fluid communication with said passageway intermediate of said one wall and said valve means for providing indications of pressure before and after the time at which said first valve means is opened.

18. In a borehole apparatus arranged for passage through a borehole, a support member adapted for passage through a bore containing well fluid to a level where a fluid sample is desired, said support member having a sample-receiving chamber, a wall-engaging member mounted on said support member for movement between a retracted condition and an extended position into engagement with the sidewall of the bore, a plurality of sample-admitting means on one of said members for isolating spaced locations along the bore when said wall-engaging member is in an extended position; hydraulic means coupled to said members for moving said members relative to one another, means in said one member for placing said sample-admitting means in fluid communication with said sample-receiving chamber including a passageway and an explosive chamber wherein one of the walls of said explosive chamber is constructed to be perforated, a shaped charge device disposed in said explosive chamber including a hollow container constructed of a high-strength, high-impact material, and explosive materials disposed in said container in confronting relationship to said one wall and adapted, upon detonation, to produce explosive forces including a perforating jet emanating from the open end of the container to perforate said one wall, a cylindrically-shaped face plate member having a central axis, a first flange having a forward face and a bulb-like portion extending along said axis to one side of said forward face, an annular sealing member received by said bulb-like portion and having one end portion abutting said flange and the remaining end portion extending beyond the end of said bulb-like portion, said sealing member being constructed of elastic material having an inner surface conforming to the contours of said bulb-like portion thereby to fasten the annular member to said bulb-like portion by elastic forces, a first, normally-closed valve means in said passageway; means for opening said first valve means; a second, normally-open valve means in said passageway, said second valve means being disposed intermediate of said first valve means and said sample-receiving chamber; means for closing said second valve means; and pressure-responsive means in fluid communication with said passageway intermediate of said one wall portion and said first valve means for providing indications of pressure before and after the time at which the respective first and second valve means are actuated.

19. In a fluid sampling apparatus, a cylindrically-shaped face plate member having a central axis, a first flange having a forward face and a bulb-like portion extending along said axis to one side of said forward face, an annular sealing member received by said bulb-like portion and having one end portion abutting said flange and the remaining end portion extending beyond the end of said bulb-like portion, said sealing member being constructed of elastic material having an inner surface conforming to the contours of said bulb-like extension thereby to fasten the annular member to the extension by elastic forces, said sealing member having a lesser diameter than said flange.

20. The apparatus of claim 19 wherein the remaining end portions of said annular member have a cylindrical curvature.

21. Fluid sampling apparatus comprising: an elongated support member having a low-pressure, sample-receiving chamber; a wall-engaging member mounted on said support member; means coupled to said members for moving said members relative to one another; a pair of like, annular, elastic sealing rings rigidly mounted on said support member in longitudinally-spaced and protruding relation thereto, said rings being symmetrically positioned above and below the wall-contacting face of said wall-engaging member on a diametrically-opposite side of said support member from said wall-engaging member, and means for placing the central portion of said rings in fluid communication with said sample-receiving chamber.

22. In a fluid sampling apparatus for use in a well bore, the combination comprising: support means having a bore opening to its exterior, a first passageway opening into the rearward portion of said bore and a second passageway opening into an intermediate portion of said bore, a first piston disposed in a first position in the rearward portion of said bore intermediate of said first and second passageways, a second piston normally disposed in a first position in the forward portion of said bore, means for sealing a portion of said second piston in said first position to prevent flow of fluid between the exterior of said support means and said second passageway, a spacer member connected to one of said pistons and abutting the other piston to space the pistons from one another whereby said first and second pistons may be displaced to a second position upon the application of pressure via said first passageway, means providing a fluid bypass between the exterior of said support means and said second passageway when said second piston is in said second position.

23. In a fluid sampling apparatus for use in a well bore, the combination comprising: support means having a first bore opening to its exterior and a second bore of larger diameter than said first bore adjoining said first bore to form a shoulder, a first passageway opening into the rearward portion of said second bore and a second passageway opening into said first bore, a first piston disposed in a first position in the rearward portion of said second bore intermediate of said first and second passageways and adapted to abut said shoulder in said second position in said second bore, a second piston normally disposed in a first position in said first bore intermediate of the exterior opening of said first bore, said second piston having an end portion thereof sealingly interposed between the exterior opening of said bore and said second passageway, and a spacer member connected to one of said pistons and abutting the other piston to space said pistons from one another whereby said first and second pistons may be displaced to a second position upon the application of pressure to said first piston, said second piston having a relieved portion intermediate of said end portion and said first piston so that said second piston in said second position permits fluid to pass to said second passageway from the exterior of said support means.

24. Fluid sampling apparatus comprising: a support member adapted for passage through a bore containing well fluid to a level where a fluid sample is desired, said support member having a sample-receiving chamber; a plurality of sample-admitting means coupled to said support member for testing an interval of earth formations along said bore, each of said sample-admitting means including annular elastic sealing means for isolating spaced localized portions of the bore wall, said sealing rings being spaced apart in longitudinal alignment; and means detachably coupling said rings to said support member; means in said support for moving said sample-admitting means into sealing contact with a well bore including a hydraulic actuating means; means in said support for placing said sample-admitting means in fluid communication with said sample-receiving chamber including a first passageway extending between said sample-receiving chamber and said sample-admitting means; a second passageway extending between the well fluid exterior of said support member and said sample-admitting means; normally-closed balance valve means in said second passageway and means for selectively providing an operating force to said balance valve means from said hydraulic actuating means for opening said balance valve means to admit well fluid to said sample-admitting means.

25. Fluid sampling apparatus comprising: a support member adapted for passage through a bore containing well fluid to a level where a fluid sample is desired, said support member having a sample-receiving chamber; sample-admitting means coupled to said support member for testing earth formations along said bore including elastic sealing means for isolating a localized portion of said bore wall; means in said support for moving said sample-admitting means into sealing contact with a well bore including a hydraulic actuating means; means in said support for placing said sample-admitting means in fluid communication with said sample-receiving chamber including a first passageway extending between said sample-receiving chamber and said sample-admitting means; a second passageway extending between the well fluid exterior of said support member and said sample-admitting means; normally-closed balance valve means in said second passageway and means for selectively providing an operating force to said balance valve means from said hydraulic actuating means for opening said balance valve means to admit well fluid to said sample-admitting means.

References Cited in the file of this patent

UNITED STATES PATENTS

| | | |
|---|---|---|
| 2,155,718 | Layne et al. | Apr. 25, 1939 |
| 2,262,655 | Seale | Nov. 11, 1941 |
| 2,313,176 | Shelby | Mar. 9, 1943 |
| 2,363,793 | Johnson | Nov. 28, 1944 |
| 2,441,894 | Mennecier | May 18, 1948 |
| 2,509,608 | Penfield | May 30, 1950 |
| 2,582,719 | Ramsey | Jan. 15, 1952 |
| 2,588,549 | Marsh | Mar. 11, 1952 |
| 2,612,346 | Nelson | Sept. 30, 1952 |
| 2,649,046 | Davis | Aug. 18, 1953 |
| 2,674,313 | Chambers | Apr. 6, 1954 |
| 2,688,369 | Broyles | Sept. 7, 1954 |
| 2,926,603 | Lindsay | Mar. 1, 1960 |
| 2,965,176 | Brieger et al. | Dec. 20, 1960 |
| 3,011,554 | Desbrandes et al. | Dec. 5, 1961 |
| 3,021,784 | Meddick | Feb. 20, 1962 |